(12) United States Patent
Downs

(10) Patent No.: US 6,254,507 B1
(45) Date of Patent: Jul. 3, 2001

(54) REVERSE ONE-WAY TORQUE CONVERTER CLUTCH

(75) Inventor: Robert Charles Downs, La Jolla, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/483,987

(22) Filed: Jan. 18, 2000

(51) Int. Cl.$^7$ ............................................. B60L 11/14
(52) U.S. Cl. ............................................................. 477/4
(58) Field of Search ........................ 477/3, 4; 192/45.1, 192/3.25, 3.26, 3.29

(56) References Cited

U.S. PATENT DOCUMENTS

| | | |
|---|---|---|
| 2,574,573 | 11/1951 | Libby . |
| 3,497,043 | 2/1970 | Leonard . |
| 4,304,107 | 12/1981 | Fall et al. ................................. 64/27 |
| 4,410,071 | * 10/1983 | Osterman ................................. 477/4 |
| 4,509,389 | 4/1985 | Vahratian et al. ...................... 74/695 |
| 4,951,788 | 8/1990 | Martin .................................. 192/3.3 |
| 5,129,493 | 7/1992 | Edmunds ............................ 192/3.29 |
| 5,637,987 | 6/1997 | Fattic et al. ............................ 322/40 |
| 5,698,905 | 12/1997 | Ruthlein et al. ....................... 290/32 |
| 5,789,823 | 8/1998 | Sherman ................................ 290/47 |

* cited by examiner

Primary Examiner—Dirk Wright
(74) Attorney, Agent, or Firm—Anthony Luke Simon

(57) ABSTRACT

A hydrokinetic torque converter of the type having a lock-up clutch plate that is operated in response to drive line conditions to connect the torque converter turbine and the torque converter impeller so as to provide a direct drive from an engine to a drive line transmission is modified to include a one way clutch that is connected between the impeller and the turbine and operative to free wheel during torque transfer from an engine to a transmission connected to the output from the torque converter and operative to lock up in the coast or back direction of drive to prevent engine stall during vehicle coasting maneuvers.

15 Claims, 3 Drawing Sheets

REVERSE ONE-WAY TORQUE CONVERTER CLUTCH

TECHNICAL FIELD

This invention relates to torque converters and more particularly to torque converters for use in parallel hybrid engine applications to prevent engine stall due to overdrive torque transfer to the engine during vehicle coasting maneuvers and regenerative braking.

BACKGROUND OF THE INVENTION

In a standard vehicle drive system it is well known to provide a torque converter between the crankshaft of an internal combustion engine and a transmission to control torque so as to smooth drive speed changes in response to operator selected drive modes made by manual or electrical setting of gear shift consoles operatively coupled to a multi-speed transmission. Examples of such prior art torque converters are shown in U.S. Pat. Nos. 3,497,043; 4,951,788 and 5,129,493. Typically, such torque converters include a lock-up clutch to produce a direct drive connection between the engine and the transmission. Furthermore, such torque converters include a damper assembly to absorb torque fluctuations from the input drive once the impeller and turbine of the torque converter are interconnected by known torque lock-up clutches.

U.S. Pat. No. 5,789,823 has an engine and/or the electric motor operated to power the vehicle. In order to provide for a desired control of power, a one-way clutch is connected between a lock-up clutch and a start clutch. The arrangement is operative to provide a high torque input from the electric motor through the torque converter turbine to the engine. Once the engine starts, the start clutch is disengaged and the engine drive is directly connected through the one-way clutch that is operative to lock in the direct drive direction so as to power the torque converter impeller or pump. Once full power is transmitted through the torque converter to the transmission, the lock-up clutch is operated to produce a 1:1 drive to the transmission in bypassing relation with the torque converter. In this configuration the one-way clutch is locked up in the drive direction during initial torque converter operation and is operative to free wheel in the drive direction when the electric drive rotor is rotating faster than the engine speed so as to permit overrunning or freewheeling between the engine and the rotor of an electric motor. Hence, the location of the one-way clutch and its operation is predicated upon an arrangement in which the stator of the electric motor is directly connected to the input housing of the torque converter for propelling the vehicle during various modes of highway operation. There is no provision for lock-up during vehicle coasting or during regenerative braking.

While suitable for its intended purpose the arrangement of the one-way clutch in the torque converter of the '823 patent does not provide for a continuous free-wheel connection between the engine and the impeller or pump of a torque converter in the drive direction and it is not operative to lock upon overdrive from the transmission to the engine during vehicle coasting.

One example operating characteristic of certain prior art torque converters including the combination shown in the '823 patent is that in operating modes in which the transmission selector is in a forward drive and the accelerator and brake are operated such that the vehicle is coasting down in speed and fuel flow to the engine is reduced to idle speed requirements, the engine can stall or its speed can fall off or droop. In such cases the vehicle driver may feel the pull of the engine when it is restarted in the case of stall or when it is operated to pull back from the drooped speed to the coasting speed of the vehicle as manifested by the vehicle wheels back driving the transmission through the output shaft of the vehicle drive system. Furthermore, advantages of regenerative braking and charging of a battery pack are lost if the engine must be restarted.

SUMMARY OF THE INVENTION

Accordingly, an object of the invention is to provide an improved torque converter having a mechanical one-way clutch connected between the pump and turbine of the torque converter that free wheels in the input drive direction so that the engine can be started by an electric motor that is directly connected to the crankshaft of the engine and wherein the one-way clutch locks to directly connect the torque converter turbine and impeller during any back drive produced during vehicle coasting to prevent engine stall when fuel is cutoff in accordance with an aggressive fuel control algorithm.

A further feature of the invention is to provide such a one-way clutch connection wherein the one-way clutch is connected in series with a spring damper to smooth any back drive coupling between the transmission and the internal combustion engine.

A still further feature of the invention is to provide such a one-way clutch connection wherein the one-way clutch has an outer race connected to the impeller housing at an inner surface thereof and has sprag clutch elements supported with respect to an inner race that is coupled to a spring damper plate that is connected through a series of damping springs to the turbine output shaft of a torque converter.

Still another object of the present invention is to provide an improved hybrid vehicle having an internal combustion engine; a torque converter and one-way clutch connection as set forth herein and an electric motor generator connected to the crankshaft of the internal combustion engine by a direct drive belt and wherein the electric motor is utilized to charge batteries during vehicle deceleration/coasting operation and wherein the controller is programmed to be responsive to vehicle braking and coasting to provide an aggressive fuel flow cut-off while the torque converter is operative to synchronize overdrive of the vehicle during coasting with the engine speed to prevent the internal combustion engine from stalling upon fuel flow cut-off during such coasting operation.

DESCRIPTION OF THE PREFERRED EMBODIMENT

Figure 1:
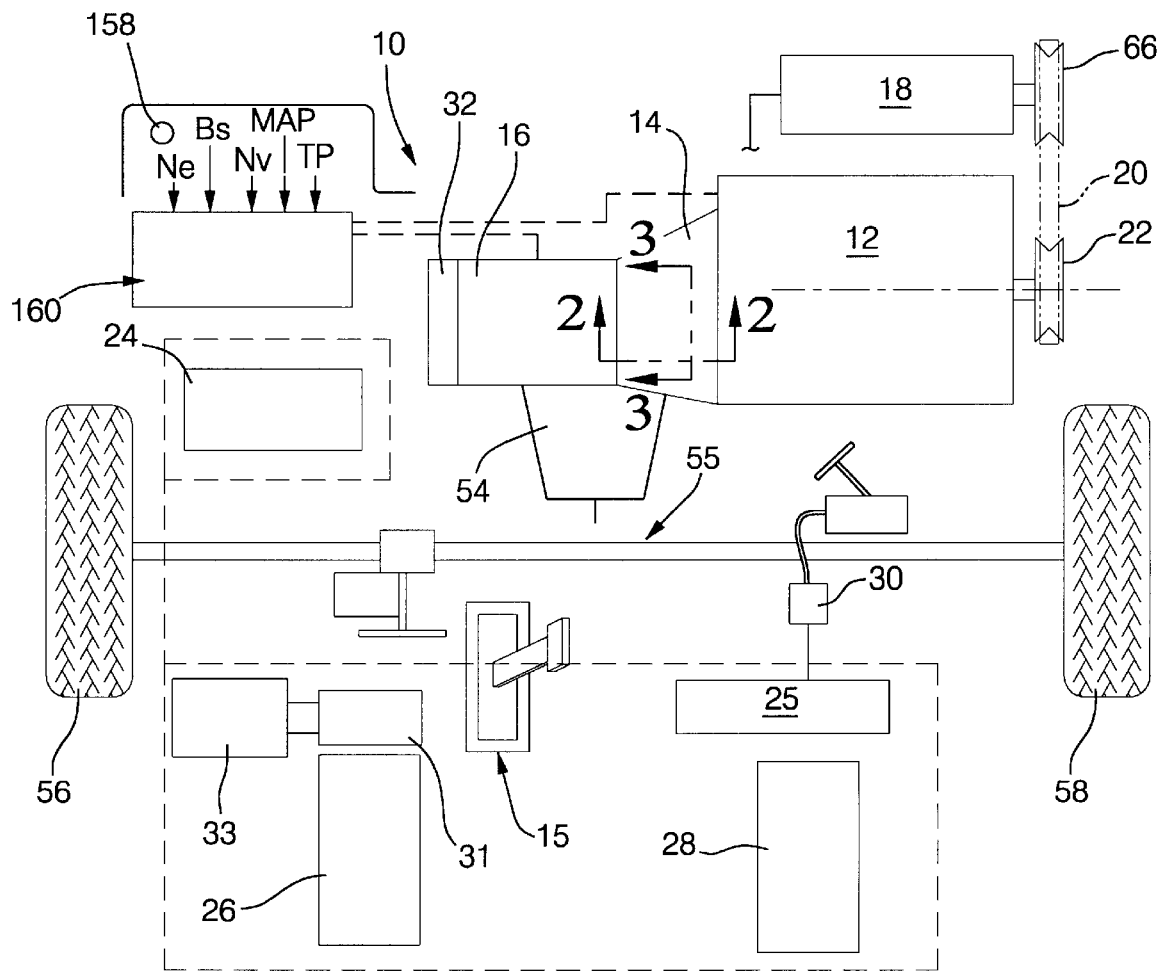
FIG. 1 is a diagrammatic view hybrid vehicle drive system including the present invention.

My invention may be used in the environment described with reference to FIG. 1 for purposes of improving the fuel efficiency of a hybrid vehicle drive system 10 including a gas engine 12, a torque converter 14 and a four speed automatic transmission 16. The hybrid drive system 10 further includes a motor generator 18 connected to the front end of the engine by a direct belt drive 20 for providing a drive path to the crankshaft 22 of the engine. The motor generator 18 is operatively associated with a controller 25 for selectively operating the engine during start or to produce generated power for charging an array of batteries 24, 26 and 28. The controller 25 is associated with a brake-pressure sensor 30 that directs a signal to the controller 25 that in addition to regulating the motor generator 18 is operative as a electronic throttle control by including programming of the type set forth in copending U.S. Pat. No. 09,483,986, for aggressively controlling the fuel flow to the gas engine during braking and coasting operations of the vehicle. The controller 25 also directs charging power from the motor generator 18 to the batteries 24–28 during generator operation to be discussed and to provide electric power for the motor generator 18 during vehicle starting and, if required to supplement the drive from the gas engine 12.

A DCDC converter 31 converts higher voltage motor generator 18 power to 12 volt for accessories.

In accordance with principles of the present invention, the transmission is modified to include a fluid pressure retention controller 32 that is operative to retain fluid pressure on the first clutch of the low speed automatic transmission 16, in a manner to be described, for purposes to be described. Additionally, the invention includes an overspeed locking and forward speed freewheeling one-way clutch assembly 34 (best shown in FIGS. 2 and 3) operatively connected between the impeller or pump 36 of the torque converter 14 and the turbine 38 thereof for purposes to be described.

The transmission 16 includes known gear sets, clutches, brakes operative to provide a number of drive speed ratios between the engine 12 and a vehicle drive system 55 such as the illustrated differential 54 and drive wheel 56, 58 arrangement with it being understood that the drive wheels can be front or rear drive wheels and that the drive system can be modified to include various forms of power transfer to and from either front or rear drive wheels or both as desired. Multi-speed transmissions 16 are well known and as such a complete description thereof is not required for purposes of understanding the configuration and operation of the present invention.

The hybrid drive system 10 includes a fluid pressure retention controller 32 that is operative to retain fluid pressure on the $1^{st}$ clutch of the transmission 16. Additionally, as diagrammatically shown in FIG. 4, the reverse lock, forward free wheel one-way clutch 34 is connected between the impeller 36 and the turbine 38 of the torque converter 14. Furthermore, in the preferred embodiment, the direct cross connection of the reverse lock, forward free wheel one-way clutch 34 can include connection to the spring damper assembly 60 for a lock-up clutch 62. The preferred connection is shown in solid line in the diagrammatic showing of FIG. 4 and the alternative direct connection is shown by broken line designated by reference numeral 64 in FIG. 4.

Figure 4:
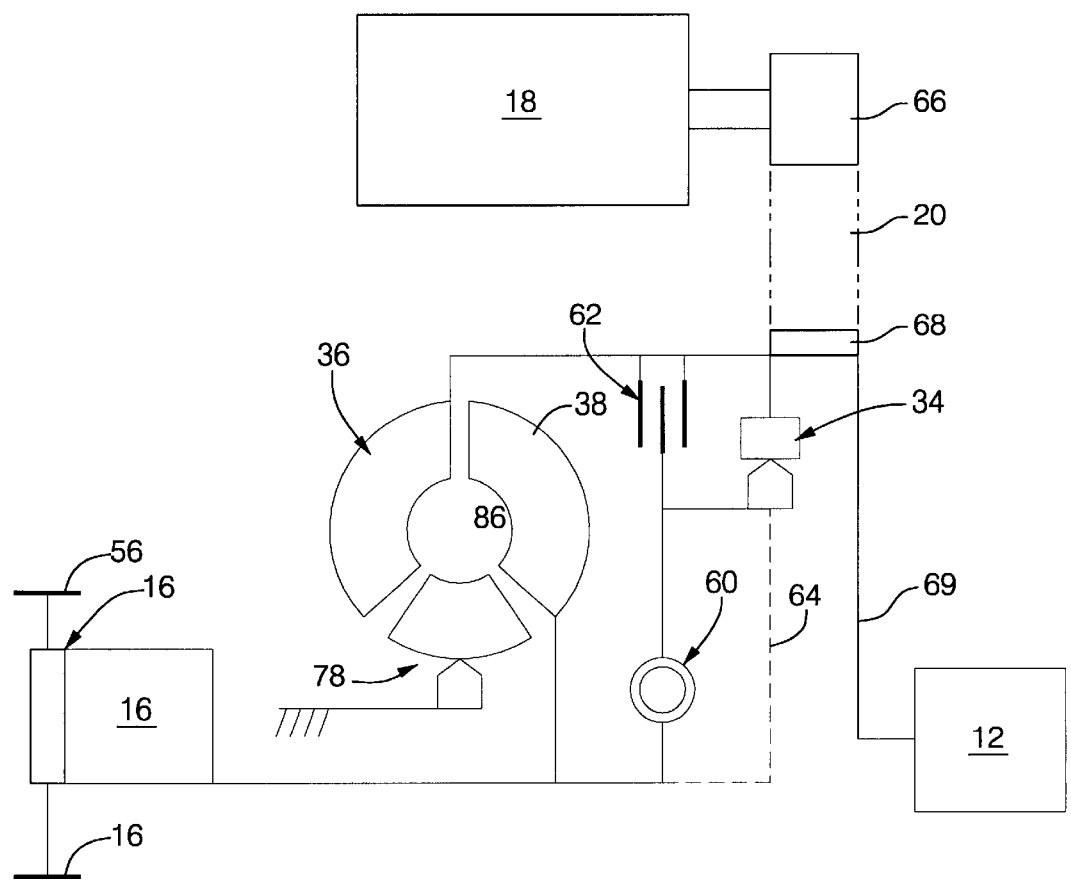
FIG. 4 is a line diagram of a torque converter and transmission for use in the drive system of FIG. 1.

The electric motor 18 is directly connected by belt 20 via a pulley 66 and a direct drive connection 68 directly to the crankshaft of the engine 12, diagrammatically designated by reference numeral 69 in FIG. 4.

Alternatively, a donut type motor can be provided around the torque converter (or clutch) instead of using a motor/belt drive combination.

Hence, during direct forward drive by either conditioning the electric motor 18 to be a starting motor for the engine 12 or during direct forward drive by the engine 12, the one-way clutch 34 is operative to free wheel. However, because of the direct (or damper spring) connection between the impeller 36 and turbine 38 the reverse lock, forward free wheel one-way clutch 34 will lock-up during back drive from the transmission as in the case of vehicle deceleration or coasting while the gear selector is in a forward drive position so as to prevent engine speed droop or fall off.

Figure 2:
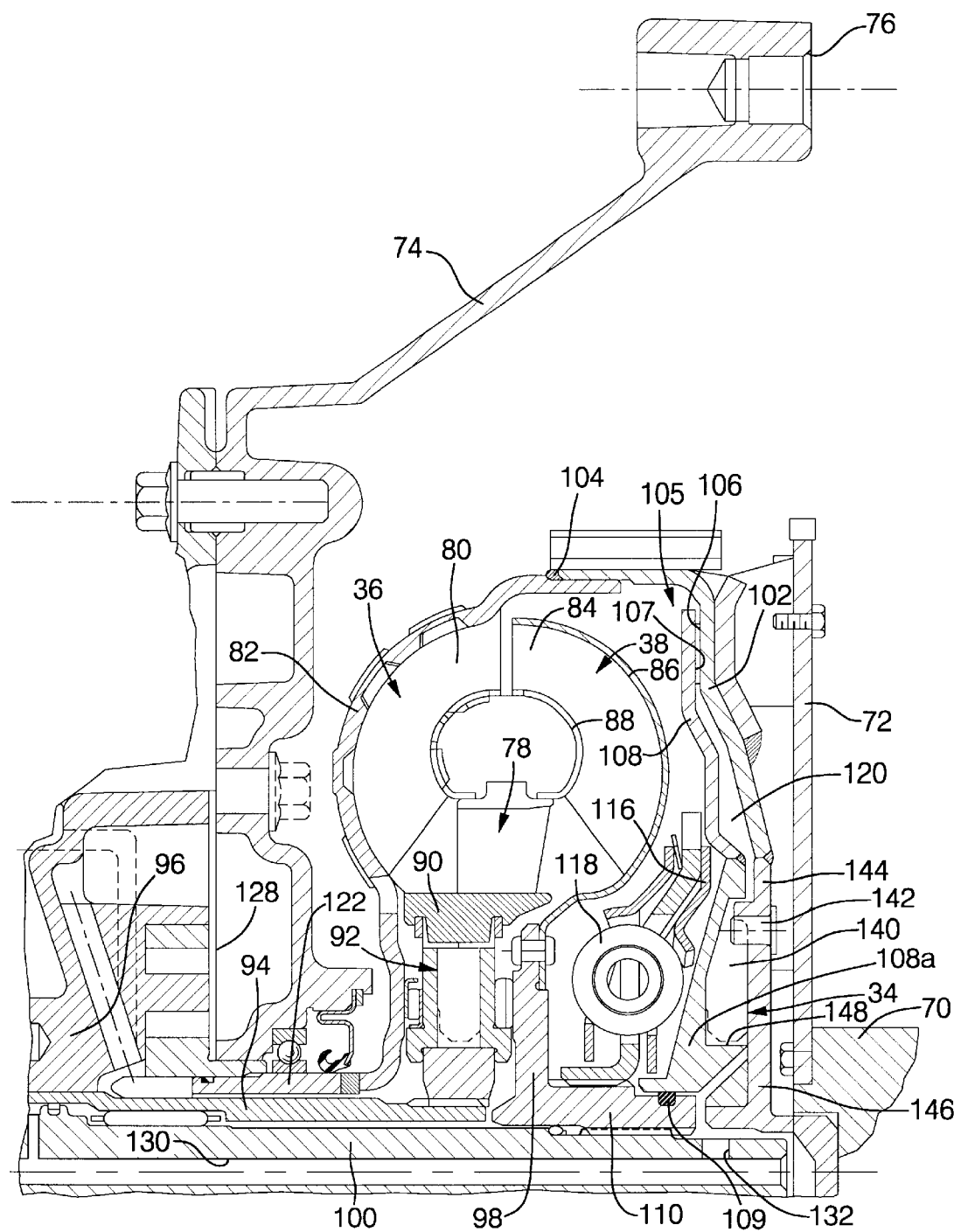
FIG. 2 is an enlarged fragmentary cross-sectional view taken along the line 2—2 of FIG. 1 looking in the direction of the arrows showing a sectional view of the modified torque converter of the present invention.
Figure 3:
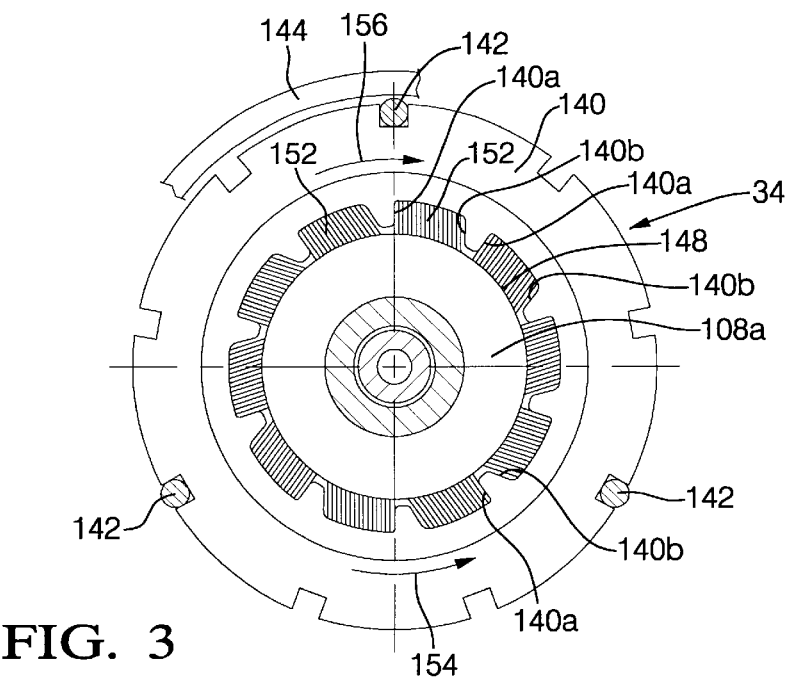
FIG. 3 is an enlarged fragmentary sectional view taken along the line 3—3 of FIG. 1 showing the component parts of a one-way clutch connected between the impeller and the turbine of the modified torque converter.

For a full understanding of the operation of the modified torque converter of the present invention further detail of the torque converter 14 is set forth in FIGS. 2 and 3. Numeral 70 in FIG. 2 designates the end of an engine crankshaft and numeral 72 designates a spring damped flywheel of the hydrokinetic torque converter 14 that is mounted on the axis of the crankshaft. A torque converter housing 74 is adapted to be bolted to the engine housing at its margin 76.

Torque converter 14 includes the impeller 36, the turbine 38 and a bladed reactor 78. The impeller 36 has toroidal outflow blades 80 secured to the interior of an impeller housing 82. Turbine 38 has radial inflow blades 84 disposed between outer turbine shroud 86 and inner turbine shroud 88. Reactor 78 includes blades supported by reactor hub 90. They are situated between the flow exit section of the turbine 38 and the flow entrance section of the impeller 36. Reactor 78 includes an overrunning brake 92 in the hub 90, which accommodates one-way torque delivery to a stationary reactor sleeve shaft 94, the latter being connected to a support wall 96 which forms a part of the torque converter housing 74.

Turbine 38 has a turbine hub 98 to which the inner margin of the outer shroud 86 of the turbine 38 is secured. Turbine hub 98 is splined to the turbine sleeve shaft 100.

Sleeve shaft 100 transfers torque to the four speed automatic transmission which is arranged on an axis parallel to the axis of the converter.

Numeral 102 designates the forward wall of the converter housing which is welded at its outer margin 104 to the impeller housing 82 and is associated with a known type torque converter lock-up clutch 105. The clutch 105 is defined by an annular friction surface 106 on the wall 102 at a radially outward location. That surface is adapted to be engaged by the friction surface 107 of a lock-up clutch piston plate 108. The inner margin 108a of the piston plate 108 is mounted on and sealed by an O-ring 109 on an extension of the turbine hub 98, shown at 110, and is adapted to move axially with respect to the turbine hub 98.

The spring damper assembly 60 includes a damper driven plate 112 splined at 114 to the turbine hub 98. A damper driving plate 116 is secured to a radially outward portion of the lock-up clutch piston plate 108. Damper springs 118 interposed between the plates 112, 116 establish a resilient connection between driving plate 116 and the driven plate 112. For an understanding of the general configuration and mode of operation of a damper of this general type, reference may be made to U.S. Pat. Nos. 2,574,573 and 4,304, 107, as well as previously mentioned U.S. Pat. No. 4,509, 389.

The clutch piston plate 108 is urged into engagement with the converter housing 102 by the circuit pressure in the torus circuit for the converter. When control pressure is supplied to the annular space or cavity 120 between the piston plate 108 and the wall 102 of the converter housing, fluid flow is passed across the friction surfaces of the converter housing and the piston plate, thereby releasing the clutch. The fluid that passes across the friction surfaces in a radially outward direction is added through the flow normally distributed through the torus circuit, and the combined flow then passes out from the torus circuit through the flow return passage.

A transmission pump drive shaft 122 is splined at 124 to an extension 126 on the outer shroud of the impeller 36. A control pump 128, as seen in FIG. 2, is adapted to be driven by drive shaft 122.

A control oil pressure distributor passage 130 is defined by the central opening of the shaft 96. Control oil pressure is distributed through passage 130 and through a radial passage 132 formed in the clutch cylinder member 78. Radial passage 132 communicates through a passage 133 in clutch plate piston 108 with the pressure chamber 120.

By controlling the pressure in the cavity 120, the engaging force of the friction surfaces 106, 107 can be controlled. The circuit pressure establishes a pressure force on the piston plate 108 to apply the clutch 105. The control pressure in the cavity 120 releases the clutch. The pressure ratio across the piston plate can be controlled to establish a continuous slipping of the clutch discs, thus reducing engine torsional disturbances and increasing the torque transmitting capacity and torque multiplication efficiency. A portion of the driving torque that is not distributed to the clutch disc is transmitted hydrokinetically through the converter to the turbine sleeve shaft 100.

The feature of the reverse locking and forward free wheeling one-way clutch assembly 34 connected between the impeller or pump 36 of the torque converter 14 and the turbine 38 provides a direct drive during operator selected multi-speed drive depending upon the position of a gear shifter 15 schematically shown in FIG. 1 and the response thereto within the transmission 16. As a consequence, the torque converter 14, in the forward direct drive operation, will provide a desired torque transfer operation until the drive speed of the transmission is synchronized to that of the gas engine 12. At this point a converter clutch actuator (not shown) is operative to release the pressure in the cavity 120 so as to cause the torus pressure to shift the piston 108 into a locked engagement with the front wall 102 of the torque converter 14. This will result in a direct drive (possibly some slip as applied and if desired during lock-up) between the impeller and turbine so that there will be direct torque transfer between the engine and the transmission.

When combined with a hybrid source of power such as an electric motor generator 18 having its rotor connected directly to the crankshaft of a vehicle such an arrangement can take advantage of back drive from the vehicle wheels to the engine as occurs during vehicle coasting operations to drive the engine crankshaft 69 to drive stator of the generator 18 during a regenerative phase of operation where the controller 34 conditions the motor generator 18 to direct charging current from the motor generator 18 to charge the batteries 24, 26, 28. During such coasting, in addition to using the vehicle momentum to recharge the batteries, it is desirable to cut-off fuel flow to the gas engine by use of an aggressive fuel control algorithm. Such operation, however, when using known torque converter designs is disadvantageous in that the fluid coupling action of the torque converter and/or slip in the lock-up clutch 62 can cause the engine speed to droop below the transmission coasting speed and when fuel is cut-off at engine idle speeds the engine can stall. In such cases the battery charge produced during coasting and the battery charge required for the electric starter motor can result in a net energy loss. Hence, the advantage of a motor generator arrangement is not fully realized.

By use of the modified torque converter of the present invention including a one-way clutch 34 that immediately locks on sensing coasting (overdrive) conditions and one that is operative to directly connect the turbine 36 to the impeller 38 will result in a drive operation in which fuel can be aggressively cut-off without engine stall or without engine speed droop that must be brought up to speed through the torque converter before direct coupling can occur in a known manner by use of a torque converter lock-up clutch such as described herein.

In the case of the present invention, as shown in FIG. 3, the one-way clutch 34 includes an outer race 140 connected by circumferentially located pins 142 to the outer end 144 of a shaft bearing support 146. When reverse drive occurs, an inner race 148 defined by an annular shoulder in lower piston part 108a is connected by sprag elements 152 directly (without any slip) to the lock-up clutch piston plate 108 that in turn is directly connected through the spring damper assembly 60 to the turbine hub extension 110 that is splined to the output shaft from the torque converter. Hence reverse or back drive will pass to the inner race 148 that in such drive direction is locked by sprag clutch elements 152 at flat radial surfaces 140a on the outer race 140 of the one-way clutch. The outer race 140 also includes surfaces 140b inclined with respect to the surfaces 140a to cause the sprag elements to release to allow free-wheeling action between the outer race 140 and inner race 148 during forward drive shown by the array identified by reference numeral 154. In reverse drive shown by the arrow identified by reference numeral 156, the transmission will directly drive the engine crankshaft without any fluid coupling slip at the torque converter. Hence, the objective of battery regeneration during vehicle coasting is possible since the electric motor/generator 18 is directly connected to the crankshaft 69 of the engine. At the same time fuel flow to the engine can be terminated when a braking signal is directed from the braking sensor 30 to the controller and processed by a suitable aggressive fuel management algorithm. Hence, the objective of reduced fuel consumption is possible since anytime braking/coasting operations are sensed fuel flow to the engine can be terminated. The net result is full use of vehicle momentum for regeneration and full termination of fuel consumption during all vehicle coasting.

I claim:

1. A torque converter assembly having a bypass clutch, said converter assembly comprising a bladed turbine including a turbine hub, a bladed impeller, a converter housing enclosing said turbine and said impeller, an annular piston plate located between said turbine and said converter housing, a clutch pressure chamber defined between said piston plate and said converter housing, a one-way clutch connected between the pump and turbine of the torque converter that free wheels in the input drive direction; said one-way clutch locking to directly connect the torque converter turbine and impeller during vehicle coasting to prevent engine stall when fuel is cut-off in accordance with an aggressive fuel control algorithm.

2. In the torque converter of claim 1, a spring damper connected between said turbine and said piston plate; said one-way clutch connected in series with a spring damper to smooth any overdrive coupling between a transmission and the engine.

3. In the torque converter of claim 1, a spring damper connected between said turbine and said piston plate; said one-way clutch having an outer race connected to said impeller housing at an inner surface thereof; an inner race connected to said spring damper and sprag clutch elements supported with respect to an inner race that is coupled to a spring damper plate.

4. In the torque converter of claim 3, said impeller housing having an inner portion thereof defining a bearing support; said outer race connected to said inner portion.

5. In the torque converter of claim 3, said impeller housing having an inner portion thereof; said outer race including an outer surface thereon with grooves thereon; fasteners connected to said inner portion received by said grooves for connecting said outer race to said impeller housing.

6. In the torque converter of claim 3, said impeller housing having an inner portion thereof; said outer race having a outer surface thereon including grooves therein and pins connected to said inner portion and including portions thereon located in said grooves.

7. In the torque converter of claim 5, said outer race and inner race having a plurality of sets of sprag elements therebetween; a first surface on said outer race engaging said sprag elements for releasing them from a locked relationship between said inner and outer races upon forward drive and further including a second surface on said outer race for engaging said sprag elements for locking them between said inner and outer races upon reverse drive.

8. In the torque converter of claim 6, said outer race and inner race having a plurality of sets of sprag elements therebetween; a first surface on said outer race engaging said sprag elements for releasing them from a locked relationship between said inner and outer races upon forward drive and further including a second surface on said outer race for engaging said sprag elements for locking them between said inner and outer races upon reverse drive.

9. A hybrid vehicle drive comprising an internal combustion engine; a torque converter having a bypass clutch, said torque converter further comprising a bladed turbine including a turbine hub, a bladed impeller, a converter housing enclosing said turbine and said impeller, an annular piston plate located between said turbine and said converter housing a clutch pressure chamber defined between said piston plate and said converter housing, a one-way clutch connected between the pump and turbine of the torque converter that free wheels in the input drive direction and one-way clutch and an electric motor generator connected to the crankshaft of the internal combustion engine by a direct drive belt and wherein the electric motor is utilized to charge batteries during vehicle deceleration/coasting operation and controller programmed to be responsive to vehicle braking and coasting to provide an aggressive fuel flow cut-off while said torque converter is operative to synchronize overdrive of the vehicle during coasting with the engine speed to prevent the internal combustion engine from stalling upon fuel flow cut-off during such coasting operation whereby an engine input can be driven by the electric motor; said one-way clutch locking to directly connect the torque converter turbine and impeller during vehicle coasting to prevent engine stall when fuel to the engine is cut-off in accordance with an aggressive fuel control algorithm.

10. In the hybrid vehicle drive of claim 9, a spring damper connected between said turbine and said piston plate; said one-way clutch connected in series with a spring damper to smooth any overdrive coupling between a transmission and the engine.

11. In the hybrid vehicle drive of claim 9, a spring damper connected between said turbine and said piston plate; said one-way clutch having an outer race connected to said impeller housing at an inner surface thereof; an inner race connected to said spring damper and sprag clutch elements supported with respect to an inner race that is coupled to a spring damper plate.

12. In the hybrid vehicle drive of claim 11, said impeller housing having an inner portion thereof defining a bearing support; said outer race connected to said inner portion.

13. In the hybrid vehicle drive of claim 11, said impeller housing having an inner portion thereof; said outer race including an outer surface thereon with grooves thereon; fasteners connected to said inner portion received by said grooves for connecting said outer race to said impeller housing.

14. In the torque converter of claim 11, said impeller housing having an inner portion thereof; said outer race having a outer surface thereon including grooves therein and pins connected to said inner portion and including portions thereon located in said grooves.

15. In the torque converter of claim 11, said outer race and inner race having a plurality of sets of sprag elements therebetween; a first surface on said outer race engaging said sprag elements for releasing them from a locked relationship between said inner and outer races upon forward drive and further including a second surface on said outer race for engaging said sprag elements for locking them between said inner and outer races upon back drive.

* * * * *